United States Patent
Yoshioka et al.

(10) Patent No.: US 12,467,170 B2
(45) Date of Patent: Nov. 11, 2025

(54) FIBER-REINFORCED COMPOSITE MATERIAL AND METHOD FOR PRODUCING THE SAME

(71) Applicants: NATIONAL AGRICULTURE AND FOOD RESEARCH ORGANIZATION, Tsukuba (JP); KOWA COMPANY, LTD., Nagoya (JP)

(72) Inventors: Taiyo Yoshioka, Tsukuba (JP); Tsunenori Kameda, Tsukuba (JP); Akimune Asanuma, Tsukuba (JP); Norihiko Fukuoka, Tsukuba (JP)

(73) Assignees: NATIONAL AGRICULTURE AND FOOD RESEARCH ORGANIZATION, Tsukuba (JP); KOWA COMPANY, LTD., Nagoya (JP)

( * ) Notice: Subject to any disclaimer, the term of this patent is extended or adjusted under 35 U.S.C. 154(b) by 0 days.

(21) Appl. No.: 17/437,667

(22) PCT Filed: Mar. 13, 2020

(86) PCT No.: PCT/JP2020/010995
§ 371 (c)(1),
(2) Date: Sep. 9, 2021

(87) PCT Pub. No.: WO2020/184697
PCT Pub. Date: Sep. 17, 2020

(65) Prior Publication Data
US 2022/0127768 A1    Apr. 28, 2022

(30) Foreign Application Priority Data
Mar. 13, 2019    (JP) ................. 2019-046521

(51) Int. Cl.
*D04H 1/4266*    (2012.01)
*C08J 5/04*    (2006.01)

(52) U.S. Cl.
CPC ............ *D04H 1/4266* (2013.01); *C08J 5/045* (2013.01); *D10B 2211/04* (2013.01); *D10B 2401/061* (2013.01); *D10B 2401/063* (2013.01)

(58) Field of Classification Search
CPC .... C08J 5/04; C08J 5/045; D04H 3/12; D04H 1/4266; D01F 4/00; D10B 2211/04
See application file for complete search history.

(56) References Cited

U.S. PATENT DOCUMENTS

| | | | |
|---|---|---|---|
| 2010/0040816 | A1 | 2/2010 | Verpoest et al. |
| 2017/0226674 | A1 | 8/2017 | Jerez |

(Continued)

FOREIGN PATENT DOCUMENTS

| | | | |
|---|---|---|---|
| CN | 100369973 C | * | 2/2008 |
| JP | S5921938 U | | 2/1984 |
| JP | 2001207585 A | | 8/2001 |
| JP | 2003219493 A | | 7/2003 |
| JP | 2009530469 A | | 8/2009 |
| JP | 2017170648 A | | 9/2017 |

(Continued)

OTHER PUBLICATIONS

Reddy et al. "Structure and Properties of Ultrafine Silk Fibers Produced By Theriodopteryx Ephemeraeformis." Journal of Material Science 45 (2010): 6617-6622. (Year: 2010).*

(Continued)

*Primary Examiner* — Jenna N Chandhok
(74) *Attorney, Agent, or Firm* — Lucas & Mercanti, LLP

(57) ABSTRACT

An object of the present invention is to develop and provide a fiber-reinforced composite material having a bagworm silk thread(s) as a reinforcing fiber and being isotropic in terms of elastic modulus and strength. A fiber-reinforced composite material having nonwoven fabric(s) including bagworm silk thread as a reinforcing fiber is also provided.

4 Claims, 1 Drawing Sheet

(56) References Cited

U.S. PATENT DOCUMENTS

| | | |
|---|---|---|
| 2017/0266889 A1 | 9/2017 | Takahashi et al. |
| 2020/0130335 A1 | 4/2020 | Uchida et al. |
| 2020/0277710 A1 | 9/2020 | Yoshioka et al. |
| 2020/0407518 A1 | 12/2020 | Yoshioka et al. |
| 2021/0161115 A1 | 6/2021 | Yoshioka et al. |
| 2021/0172089 A1 | 6/2021 | Yoshioka et al. |
| 2021/0372007 A1 | 12/2021 | Yoshioka et al. |

FOREIGN PATENT DOCUMENTS

| | | |
|---|---|---|
| JP | 2018197415 A | 12/2018 |
| JP | 2019013207 A | 1/2019 |
| WO | 2012165477 A1 | 12/2012 |
| WO | 2019009302 A1 | 1/2019 |
| WO | 2019049771 A1 | 3/2019 |
| WO | 2019131333 A1 | 7/2019 |
| WO | 2019203228 A1 | 10/2019 |
| WO | 2020045381 A1 | 3/2020 |

OTHER PUBLICATIONS

Osaki et al. "Why are Bagworm's Silks Mechanical Strong?", Polymer Preprints. 50.14 (2001): 3493-3494.). (Year: 2001).*

Machine Translation of CN100369973C (Year: 2008).*

Hiramatsu, "Well Understanding of Carbon Fiber Composite (Beginner's Guide)", Nikkan Kogyo Shimbun, Ltd., 2015, Chapter 1, 15 pages, Partail English translation 1 page.

Mathijsen, "Beyond carbon fiber: What will be the fibers of choice for future composites?", Reinforced Plastics, 2016, vol. 60, No. 1, pp. 38-44.

Kuwana et al., "High-Toughness Silk Produced by a Transgenic Silkworm Expressing Spider (*Araneus ventricosus*) Dragline Silk Protein", PLOS One, 2014, vol. 9, No. 8, pp. 1-11.

Osaki, Animals Teach Science on Natural Fibers:—Spider's Silks, Bagworm's Silks, and Collagen Fibers—, Journal of the Society of Fiber Science and Technology, 2002, vol. 58, No. 3, pp. 74-78, Partial English Translation 3 Pages.

Gosline et al., "The Mechanical Design of Spider Silks: From Fibroin Sequence to Mechanical Function", The Journal of Experimental Biology, 1999, vol. 202, pp. 3295-3303.

International Search Report for Corresponding International Application No. PCT/JP2020/010995, 3 Pages, Jun. 2, 2020.

Supplementary European Search Report for Corresponding European Application No. 20770303.4, Nov. 14, 2022, 7 pages.

Office Action issued for the corresponding Indian Patent Application No. 202117045742, dated May 1, 2023, 7 pages.

Office Action for Corresponding Japanese Patent Application No. 2021-505152, May 7, 2024, 6 Pages.

* cited by examiner

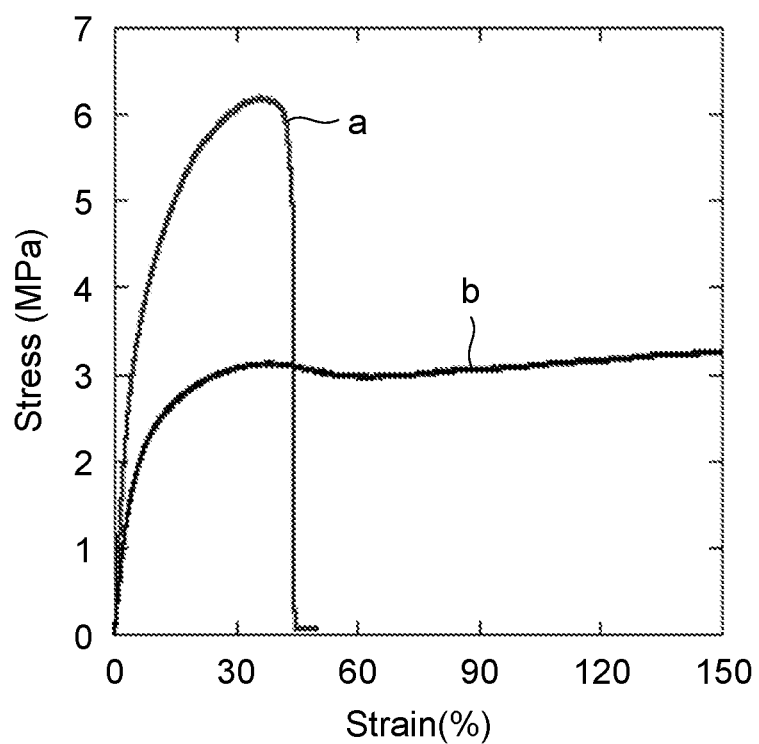

FIBER-REINFORCED COMPOSITE MATERIAL AND METHOD FOR PRODUCING THE SAME

CROSS-REFERENCE TO RELATED APPLICATIONS

This application is a 371 of PCT/JP2020/010995, filed Mar. 13, 2020, which claims the benefit of Japanese Patent Application No. 2019-046521, filed Mar. 13, 2019.

TECHNICAL FIELD

The present invention relates to a fiber-reinforced composite material comprising nonwoven fabric comprising a bagworm silk thread(s) as a reinforcing fiber and to a method for producing the same.

BACKGROUND ART

A fiber-reinforced composite material complexed with a reinforcing fiber and a base material is a light weight material with high strength and high elastic modulus, as represented by Carbon Fiber-Reinforced Plastics (CFRPs) and Glass Fiber-Reinforced Plastics (GFRPs). Such high strength and high elastic modulus are mainly attributed to the mechanical properties of a reinforcing fiber such as a carbon fiber, glass fiber, and aramid fiber. For example, carbon fiber is known to have superior mechanical feature of about 10 times higher than that of iron in terms of the specific strength, which is the strength divided by mass of the material (Non-Patent Literature 1). Such mechanical properties allow the fiber-reinforced composite materials to be used in various fields, including sports/leisure goods, automobiles, houses, buildings, and aircrafts, as substitutes for metals.

However, conventional reinforcing fibers used in a fiber-reinforced composite material have a common property of "non-stretchable." This property has been a main cause of "brittleness" in a fiber-reinforced composite material or of "peeling" at the interface between reinforcing fiber and base material. Particularly when a base material has a flexible property, peeling from reinforcing fiber in a fiber-reinforced composite material has been a serious problem.

Thus, an attempt to solve this problem has been made by using, fiber having a high strength, a high elastic modulus, and an elongation property as a next-generation reinforcing fiber for a fiber-reinforced composite material. For example, a thread from spider (herein often referred to as "spider thread") having very high toughness and elongation property is currently gaining attention as a next-generation reinforcing fiber (Non-Patent Literature 2).

However, there are many problems to be solved in terms of mass productivity and production cost for practical use of the spider thread as a reinforcing fiber. For example, differing from the silkworm, it is hard to breed a number of spiders, and it is impossible to collect a large amount of silk thread directly from spiders. This makes mass-production of the spider thread difficult and consequently causes a problem of high production cost. The problems associated with mass-production of the spider thread are currently tried to be solved by transgenic technology using *Escherichia coli* or silkworm (Patent Literature 1 and Non-Patent Literature 3). However, this technology brings about new problems. Since *Escherichia coli* and silkworm used for spider thread production are genetic transformants, they are allowed to be cultured or bred only in facilities with predetermined equipment. Therefore, a large-scale production facility is needed for industrial-scale production of the spider thread, which in turn requires a large maintenance cost. Furthermore, spider thread proteins obtained from the *Escherichia coli* are in liquid form, and more producing processes are thus inevitably required for conversion into fibers. Accordingly, in using the spider thread as a reinforcing fiber, the problem of mass-production can be solved, but the problem of production cost will remain unsolved.

Based on such technical background, the inventors have developed a technique for producing a fiber-reinforced composite material, using a silk thread spun by bagworm (also known as "basket worm") (herein often referred to as "bagworm silk thread"), instead of the spider thread, as a reinforcing fiber (Patent Literature 2).

A moth larva belonging to the family Psychidae in the order Lepidoptera is collectively refers to as a bagworm, and a silk thread spun by this insect has well-balanced strength and elongation, and has mechanical features superior to those of a silkworm silk thread and a spider thread. For example, bagworm silk thread from *Eumeta minuscula* has an elastic modulus 3.5 times higher than that of silkworm silk thread and 2.5 times higher than that of spider thread from *Nephila clavata* (Non-Patent Literature 4 and 5). Furthermore, the inventors have also indicated that bagworm silk thread from *Eumeta japonica* also has similar mechanical features, as compared to silkworm silk thread and spider thread from *Araneus ventricosus* (Patent Literature 3). For example, the elastic modulus is about 5 times higher than that of silkworm silk thread and 3 times or higher than that of spider thread. Moreover, the fracture strength is 3 times or higher than that of silkworm silk thread and about 2 times higher than that of spider thread, and the elongation at break is 1.3 times or higher than that of silkworm silk thread and nearly equal to that of spider thread. Particularly, the toughness is 4 times or higher than that of silkworm silk thread and 1.7 times or higher than that of spider thread, and the bagworm silk thread has been found to be at the toughest level among natural fibers. Indeed, a fiber-reinforced composite material using the bagworm silk thread as a reinforcing fiber has increased elastic modulus compared to that of a simple polymer matrix, and use of a continuous bagworm silk thread could significantly improve the problem of low elongation at break, which has been a problem to be solved in CFRPs and GFRPs.

Additionally, it is advantageous that bagworms can be bred on a large scale, similarly to silkworm, and are more easily bred and controlled than silkworms. For example, bagworm is euryphagous and has little specificity for leaves for feed and therefore can feed on leaves of tree of various species, while silkworm feeds on only raw leaves of species belonging to the genus *Morus* (mulberry leaves) in principle, and thus the region and season for breeding are dependent on the source of mulberry leaves and the season of mulberry leaves open. Accordingly, food leaves for bagworms are easily obtainable and bagworm can be raised in any region. In addition, since bagworm can also feed on leaves of evergreen trees, it is possible to supply food leaves all year round, unlike mulberries, which are deciduous trees. Moreover, since bagworm is smaller in size than silkworm and is easily bred in a group, a number of bagworms can be bred in even a small breeding space. Thus, the cost of breeding can significantly be reduced. Additionally, production of genetic transformants and special production facilities to maintain and control them are not necessarily needed because bagworm silk thread can be collected directly from bagworm. Also, fewer production processes are required because conversion into fibers is unnecessary. Accordingly, the bagworm silk thread has a potential to solve not only the problem of mass-production but also the problem of production cost, which remains unsolved with the spider thread.

CITATION LIST

Patent Literature

Patent Literature 1: WO 2012/165477
Patent Literature 2: JP 2017-170648
Patent Literature 3: JP 2018-197415 A Non-Patent Literature Non-Patent Literature 1: Tom Hiramatsu, "Well Understandable Introduction for Carbon Fiber Composite", Chapter 1, Nikkan Kogyo Shimbun, Ltd., 2015.
Non-Patent Literature 2: Mathijsen D., 2016, Reinforced Plastics, 60: 38-44.
Non-Patent Literature 3: Kuwana Y, et al., 2014, PLoS One, DOI: 10.1371/journal.pone.0105325.
Non-Patent Literature 4: Shigeyoshi Osaki, 2002, Sen'i Gakkaishi (Sen'i To Kogyo), 58: 74-78.
Non-Patent Literature 5: Gosline J. M., et al., 1999, J. Exp. Biol., 202, 3295-3303.

SUMMARY OF INVENTION

Technical Problem

The inventors have succeeded in developing a fiber-reinforced composite material with high strength and high elastic modulus and having an elongation property, conventional products did not have, by using the bagworm silk thread as a reinforcing fiber (JP 2017-170648). On the other hand, if strength and elastic modulus of the fiber-reinforced composite material have an isotropy, the range of application as a fiber-reinforced composite material would be much broader.

Thus, an object of the present invention is to develop and provide a fiber-reinforced composite material comprising a bagworm silk thread(s) as a reinforcing fiber and having isotropy in terms of elastic modulus and strength.

Solution to Problem

The inventors have studied hard to solve the above problems and consequently succeeded in producing a fiber-reinforced composite material with isotropic strength, elastic modulus, and elongation by using a nonwoven fabric comprising a bagworm silk thread(s), particularly a continuous fiber bagworm silk thread(s), of random orientation as a reinforcing fiber. The present invention is based on the above study result and provides the following inventions.

(1) A nonwoven fabric comprising a bagworm silk thread(s).

(2) A fiber-reinforced composite material comprising a polymer matrix/matrices and the nonwoven fabric comprising a bagworm silk thread(s).

(3) The fiber-reinforced composite material according to (2), wherein the bagworm silk thread comprises a continuous fiber silk thread(s).

(4) The fiber-reinforced composite material according to (2) or (3), wherein the nonwoven fabric comprises an organic fiber other than bagworm silk thread(s), an inorganic fiber(s), and/or a combination thereof.

(5) The fiber-reinforced composite material according to (4), wherein the organic fiber is a silkworm silk thread and/or a spider thread.

(6) The fiber-reinforced composite material according to any one of (2) to (5), wherein the polymer matrix is resin, glue, starch, agar, or a combination thereof.

(7) The fiber-reinforced composite material according to any one of (2) to (6), wherein the mass percentage of the bagworm silk thread in the fiber-reinforced composite material ranges from 0.5% by mass to 50% by mass.

This specification includes the content disclosed in Japanese Patent Application No. 2019-046521, to which the priority of the present application is based.

Effects of Invention

According to the fiber-reinforced composite material of the present invention, a fiber-reinforced composite material having high strength, elastic modulus and elongation property and those physical properties being isotropic can be provided.

BRIEF DESCRIPTION OF DRAWING

The FIGURE shows the stress-strain curves of (a) a BSNF/EVA composite material and (b) a simple EVA resin cut out in the direction at an angle of 0°.

DESCRIPTION OF EMBODIMENTS

1. Fiber-Reinforced Composite Material 1-1. Overview

The first aspect of the present invention is a fiber-reinforced composite material. The fiber-reinforced composite material of the present invention is characterized by the use of nonwoven fabric comprising bagworm silk thread as a reinforcing fiber base material. According to the present invention, a fiber-reinforced composite material with high strength, elastic modulus, and elongation property, which has not been detected in conventional CFRPs and GFRPs, and those physical properties being isotropic can be provided.

1-2. Definition

The terms frequently used herein are defined as follows.

The term "fiber-reinforced composite material" refers to a material composed of two or more distinct materials, that is, reinforcing fiber and base material, in which those materials are not fused to each other but are assembled in a separated state.

The term "reinforcing fiber" as used herein refers to a fiber base material in a fiber-reinforced composite material. The reinforcing fiber generally means a reinforcing material that imparts strength to fiber-reinforced composite material, but the term as used herein refers to reinforcing material that imparts at least one or more of strength, elastic modulus, and elongation to fiber-reinforced composite material.

As used herein, the term "base material" is also called "matrix" and refers to a supporting base material in fiber-reinforced composite material. The base material is usually a material to which strength being imparted in fiber-reinforced composite material. However, not only the reinforcing fiber herein serves as reinforcing material itself, but also the base material, as a filler material to fill the spaces between the reinforcing fibers, can serve as a reinforcing material to strengthen the reinforcing fiber. That is, in the fiber-reinforced composite material of the present invention, each component mutually enhances advantages and/or complement disadvantages each other. Accordingly, fiber-reinforced composite material with novel features that the original materials do not have can be obtained.

The term "polymer matrix" as used herein refers to a base material composed of an organic polymer and/or an inorganic polymer.

The term "silk thread" as used herein refers to a proteinaceous thread spun by an insect in the larval or adult stage for nest building, migration, anchoring, cocooning, and prey capture, and the like. The "silkworm silk thread" spun by the silkworm for cocooning is a typical silk thread. However, when the term "silk thread" is simply recited in the present specification, the term means a bagworm silk thread, unless specified otherwise. A bagworm silk thread is a silk thread spun by a bagworm, as described above. More specifically, the bagworm silk thread includes bagworm silk thread for a foothold (herein referred to as "foothold silk thread") or bagworm silk thread for nest building (herein referred to as "nest silk thread"). The "foothold silk thread" refers to a silk thread spun by a bagworm in advance of migration and functions as a foothold for preventing fall from a branch, a leaf, or the like during migration. On the other hand, the "nest silk thread" refers to a silk thread forming a nest, which is spun to assemble pieces of leaves and twigs or to make an inner wall of a nest so that its accommodation space becomes a comfortable environment. In general, the foothold silk thread is thicker and mechanically stronger than the nest silk thread.

The "silk thread" herein encompasses a monofiber, spun fiber, silk yarn, and fiber assembly. The "monofiber" refers to the smallest filament unit (monofilament) constituting a silk thread and is a fiber component such as fibroin protein obtained by removing covering components such as sericin protein from a spun fiber as described below. Monofiber is usually obtained by degumming spun fibers. The "spun fiber" refers to a silk thread spun by an insect. For example, a bagworm spun fiber is composed of a difilament made of a set of two monofibers bound with the coating components. The "silk yarn" refers to a spun thread obtained by spinning discontinuous fiber silk thread as described below. The "fiber assembly" refers to an assembly of bundles of silk thread fibers and is also called multifilament. The fiber assembly in the present specification is composed of monofibers, spun fibers, silk yarns, or a combination thereof. The fiber assembly in the present specification encompasses an assembly composed of only silk threads from a same biological species, such as bagworm silk threads, and a mixed fiber composed of silk threads from different biological species, such as bagworm silk threads and silkworm silk threads or bagworm silk threads and spider threads. Additionally, the fiber assembly encompasses not only twisted fiber but also non-twisted fiber.

The term "nonwoven fabric" refers to a sheet-like form material formed not by weaving, but by entangling fibers. The form of nonwoven fabric is not limited in particular and may be any form, such as a cloth-like, paper-like, or leather-like form. According to the term of nonwoven fabric in Japan Industrial Standard (JIS) L0222, nonwoven fabric is defined as "a sheet, web, or batting of fiber in which fibers are oriented unidirectionally or randomly and bonded with each other by entanglement and/or fusion and/or adhesion; excluding paper, woven fabric, knitted fabric, tufted fabric, and fulled felt." The nonwoven fabric used in the present invention follows the above definition in principle. However, in the present specification, felt is exceptionally included in the nonwoven fabric.

As used herein, the term "isotropic" refers to physical properties independent of direction. For example, in the case of a fiber-reinforced composite material with a flat sheet-like shape, the term refers to having equivalent levels of strength, elastic modulus, and elongation in any directions on a plane. In the case of a fiber-reinforced composite material with a three-dimensional shape, the term refers to having equivalent levels of strength, elastic modulus, and elongation in any directions in the three-dimensional space. Additionally, the term "isotropy" as used herein refers to having isotropic properties. On the other hand, the term "anisotropic" refers to physical properties dependent of direction, and the term "anisotropy" refers to having such properties. For example, if a fiber-reinforced composite material with a sheet-like shape has different levels of physical properties between an arbitrary direction and a direction perpendicular to the arbitrary direction, the fiber-reinforced composite material is regarded as being anisotropic.

1-3. Constitution

1-3-1. Components

The fiber-reinforced composite material of the present invention comprises a reinforcing fiber and a polymer matrix/matrices as essential components. Each of the components will be described below.

(1) Reinforcing Fiber

The fiber-reinforced composite material of the present invention comprises a reinforcing fiber(s) in the form of a nonwoven fabric as an essential constituting fiber and may comprise not only the nonwoven fabric, but also one or more of different types of fibers as an optional constituting fiber(s).

Furthermore, the nonwoven fabric is characterized by comprising a bagworm silk thread(s), and the nonwoven fabric itself can be one aspect of the present invention. Each of the constituting fibers will be described below.

(1-1) Nonwoven Fabric

The nonwoven fabric is an essential constituting fiber as a reinforcing fiber in the fiber-reinforced composite material of the present invention. The most important feature of the present invention is comprising a bagworm silk thread(s) in the nonwoven fabric.

A bagworm silk thread is a silk thread spun by a bagworm. The bagworm collectively refers to a moth larva belonging to the family Psychidae in the order Lepidoptera, as described above. Moths belonging to the family Psychidae are distributed worldwide, and the larva (bagworm) of any species of the moth spends the whole larval stages living in a nest covered with natural materials, such as pieces of leaves and twigs, which are assembled by silk threads spun by the larva itself. The nest is a spindle-shaped, cylinder-shaped, or cone-shaped bag-like nest that can accommodate the whole body of a bagworm. A bagworm usually hides itself inside the nest and always carries the nest even during eating or migrating and in principle, even pupates inside the nest.

The species of the bagworm which spins a silk thread using for the nonwoven fabric is not limited. For example, the family Psychidae comprises the genera *Acanthopsyche, Anatolopsyche, Bacotia, Bambalina, Canephora, Chalioides, Dahlica, Diplodoma, Eumeta, Eumasia, Kozhantshikovia, Mahasena, Nipponopsyche, Paranarychia, Proutia, Psyche, Pteroma, Siederia, Striglocyrbasia, Taleporia, Theriodopteryx, Trigonodoma*, etc., and the bagworm may be a species belonging to any genus. Specific examples of the Psychidae species comprise *Eumeta japonica, Eumeta minuscula*, and *Nipponopsyche fuscescens*. Moreover, the instar of the larva (bagworm) may be any instar between the first instar and the last instar. Furthermore, the bagworm may be male or female. However, a larger bagworm is preferable to obtain a thicker and longer bagworm silk thread. For example, among the family Psychidae, a larger species is more preferable. Thus, *Eumeta japonica* and *Eumeta minuscula* are preferable species of bagworms used in the present invention, in view of obtaining a thicker and longer bagworm silk thread. Furthermore, among larvae of the same species, a larva in the last instar is more preferable, and a female larva is more preferable because a female grows larger than a male.

A bagworm silk thread used for the nonwoven fabric may be either foothold silk thread or nest silk thread or may be a mixture of both types of silk threads.

The length of a bagworm silk thread used for the nonwoven fabric is not limited. The bagworm silk thread may be any of a discontinuous fiber (silk thread with short fiber), a continuous fiber (silk thread with long fiber), and a combination thereof. However, continuous fiber is preferably comprised to achieve isotropy in terms of strength, elastic modulus, and elongation, which is an object of the present invention. Therefore, continuous fiber alone or a combination of continuous and discontinuous fibers is preferable.

In the present specification, the "discontinuous fiber" refers to a silk thread with a major axis length of 1.0 mm or more and less than 1 m, 1.5 mm or more and less than 80 cm, 2 mm or more and less than 60 cm, 2.5 mm or more and less than 50 cm, 3 mm or more and less than 40 cm, 3.5 mm or more and less than 30 cm, 4 mm or more and less than 20 cm, 4.5 mm or more and less than 10 cm, or 5.0 m or more and less than 5 cm. Specific examples of the discontinuous fiber include a fragmented spun fiber with a length of less than 1 m derived from foothold silk thread or nest silk thread, and a fragmented monofiber obtained by degumming the fragmented spun fiber.

In the present specification, the "continuous fiber" refers to a silk thread with a fiber length of 1 m or more, 2 m or more, preferably of 3 m or more, more preferably of 4 m or more, 5 m or more, 6 m or more, 7 m or more, 8 m or more, 9 m or more, or 10 m or more. The fiber length may be obtained by spinning discontinuous fibers into long lengths as in the case of silk yarns, but preferably is the continuous length of a fiber, that is the length of a filament fiber such as a monofiber or a spun fiber. In the case of a silkworm, since cocooning is performed with a continuous silk thread, a continuous fiber silk filament is relatively easily obtained by degumming and reeling a silk cocoon. However, a bagworm pupates in its nest, which is its living quarter during the larval stage, and therefore does not perform cocooning before pupation, differently from the silkworm. Furthermore, in principle, since a nest of a bagworm is expanded with the growing of the bagworm from the first instar, old and new silk threads are mixed together in the nest. Additionally, a nest of a bagworm has an opening at ends of the longitudinal axis. At one end, the bagworm can expose its head and a portion of its thorax from the opening for migration and eating. At the other end, the opening is present as an outlet for excretion of feces and the like. That is, bagworm nest always has two openings, and thus the silk thread in the nest is fragmented and discontinued. Therefore, a nest of a bagworm is itself assembled by entangling relatively discontinuous silk threads. Accordingly, a continuous silk filament is not obtainable from the nest with a commonly used method. Conventionally, it has been considered technically impossible to obtain a filament fiber with a length of 1 m or more, in the case of bagworm silk thread, due to the unique ecology of bagworms as seen above. The inventors have succeeded in solving this problem by using, for example, a method disclosed in JP 2018-197415 A.

The method for producing a nonwoven fabric, which is used as a reinforcing fiber in the fiber-reinforced composite material of the present invention, is not limited specifically. Any known method may be used to produce the nonwoven fabric from discontinuous and/or continuous fiber of the bagworm silk thread(s).

Commonly used methods for producing a nonwoven fabric comprise a fleece formation process for assembling fibers, and a fiber bonding process for bonding the assembled fibers to each other.

For the fleece formation process, any known methods, for example, an air laid method, wet laid method, spunbond method, melt blown method, flash-spinning method, or the like may be employed. The air laid method is a method in which fibers are unidirectionally or randomly oriented with a stream of air, or the like to form a fiber assembled layer. The wet laid method is a method in which discontinuous fibers are dispersed in a liquid and then filtered onto a net to form a fiber assembled layer. All of the spunbond method, melt blown method, and flash-spinning method are the production methods directly coupled with fiber spinning in which a melted raw material is extruded from nozzles, spun into fibers, and then assembled to form a sheet like form. Although these methods are generally used for synthetic fibers, a fleece can be formed by any of those methods because recombinant bagworm silk proteins can be handled in liquid form.

For the fiber bonding process, any known methods, such as a thermal bonding method, chemical bonding method, needle punching method, hydroentanglement method, may be used. The thermal bonding method is a method in which fibers of a fleece comprising heat-fusible fibers with a low melting point is bond to each other by thermal compression. The chemical bonding method is a method in which fibers at their intersection points of a fleece is bond to each other by heating and drying after impregnating or spraying with an adhesive resin emulsion. The needle punching method is a method in which fibers of a fleece is entangled by repeatedly punching the fleece with needles moving at a high speed in the vertical direction. The hydroentanglement method is a method in which fibers of a fleece is entangled by spraying pillar-shaped water under high-pressure into the fleece.

In the case of a bagworm silk thread, nonwoven fabrics can also be produced through a bagworm-specific fiber-collecting method. For example, the simplest method for producing a nonwoven fabric made of a bagworm silk thread is a method of obtaining the nonwoven fabric from a nest of a bagworm. Because the bagworm nest is assembled with entangled discontinuous fiber bagworm silk threads, as described above, the nest itself is configured as the nonwoven fabric. Therefore, with cutting open and extending a nest of a bagworm to flat form, and removing nest materials such as leaves and twigs, the nonwoven fabric made of a bagworm silk thread can be obtained. However, because it is nearly impossible to completely remove the nest materials, and the like from a bagworm silk thread, contaminants can always be comprised in nonwoven fabrics obtained by this method. The presence of such contaminants in a reinforcing fiber is normally undesirable because they are possible causes of reducing product quality or physical properties in a fiber-reinforced composite material and the advantages of using a bagworm silk thread as a reinforcing fiber can be compromised.

The nonwoven fabrics made of a bagworm silk thread can be produced using, for example, but not limited to, another fiber-collecting method disclosed in JP2018 078522 WO2019/203228A1. In this method, one or more bagworms are placed on a solvent-soluble or heat-fusible base material to allow them to spin foothold silk threads until a thin film is formed on the base material. Subsequently, the base material is dissolved in a solvent that will not damage, denature, or dissolve the bagworm silk thread, or is melted by heating to a temperature at which the bagworm silk thread is not damaged, heat-denatured, or melted, to separate the foothold silk thread from the base material component, and the thin film made of the foothold silk thread can finally be obtained as the nonwoven fabric.

The solvent-soluble base material used in this method includes water-soluble base material (water-soluble material), composed of a material soluble in water or an aqueous solution, and low polar solvent-soluble base material, composed of a material soluble in a low polar solvent. Both of the base materials are solid in the dry environment, that is the environment under normal conditions (at 15° C. to 25° C. and atmospheric pressure) and at a humidity of 50% or less, preferably of 40% or less, 30% or less, 20% or less, or 10% or less. Examples of the water-soluble base material include gelatin, starch, and pullulan, and examples of the low polar solvent-soluble base material include polystyrene, vinyl acetate, cellulose acetate, acrylic resin, and polycarbonate.

The heat-fusible base material is a base material that is a solid under normal conditions but can be easily melted into a liquid state by heating. The melting point of the heat-fusible base material may be lower than the temperature at which each bagworm silk thread is damaged, heat-denatured, or melted. Since a bagworm silk thread starts thermal degradation at a temperature higher than 260° C., the melting point may be 260° C. or lower at any rate, but in order to reduce the cost of heating and to prevent bagworm silk thread from being unnecessarily exposed to high temperatures, suitable range may be, for example, from 40° C. to 100° C., from 45° C. to 98° C., from 50° C. to 95° C., from 55° C. to 90° C., from 60° C. to 85° C., from 65° C. to 80° C., or from 70° C. to 75° C.

Additionally, the nonwoven fabric made of a bagworm silk thread can be obtained using a fiber-collecting method disclosed in WO2019/131333A1. This method is a method exploiting the behavior of the bagworm, in which a naked bagworm removed from its nest immediately starts nest building to protect and warm itself using nest materials once nest materials are provided. In this method, the naked bagworm is given a solvent-soluble or heat-fusible material as a nest material and is allowed to build a nest, and the nest material is then dissolved in a solvent that will not damage, denature, or dissolve the bagworm silk thread, or is melted by heating to a temperature at which bagworm silk thread is not damaged, heat-denatured, or melted, to separate the bagworm silk threads from the dissolved nest materials, and the remaining nest silk thread is finally obtained as the nonwoven fabric. The base material component, solvent, and conditions such as melting temperature are essentially the same as those in the above-described WO2019/203228A1, though the collected bagworm silk threads are different, foothold silk thread and nest silk thread.

Furthermore, the nonwoven fabric made of a bagworm silk thread can be obtained using a fiber-collecting method disclosed in WO2020/045381A1. In this method, one or more bagworms are placed on a base material to allow them to spin foothold silk threads until a thin film made is formed on the base material. Subsequently, a wetting liquid is sprayed or applied to bagworm silk threads spun on the surface of the base material to separate the bagworm silk threads from the base material, and the thin film made of the foothold silk thread can finally be obtained as the nonwoven fabric.

The wetting liquid used in this method is a pure substance or mixture with a melting point of lower than 20° C. and with a boiling point of 30° C. or higher and 300° C. or lower under atmospheric pressure, wherein the pure substance or mixture is a liquid at least at a temperature of 20° C. or higher and lower than 30° C. and will not damage, denature, or dissolve fibroin, a fiber component of a bagworm silk thread. For example, ethanol, an aqueous solution, an organic solvent, or the like may be used.

According to the fiber-collecting methods described in the above three applications, pure nonwoven fabrics made of a bagworm silk thread and comprising no contaminants of nest material such as dry leaves and twigs can be obtained. Accordingly, only the advantage of the bagworm silk thread as a reinforcing fiber can be imparted to a fiber-reinforced composite material without reducing product quality or physical properties in the fiber-reinforced composite material.

The nonwoven fabric in the present invention may be made of one or more types of bagworm silk thread. For example, the nonwoven fabric may be made of a bagworm silk thread derived from *Eumeta japonica* alone or of two types of bagworm silk thread derived from *Eumeta japonica* and *Eumeta minuscula*. The method for producing the nonwoven fabric made of plural types of bagworm silk thread may be essentially identical to the method for producing the nonwoven fabric made of a single type of bagworm silk thread. For example, a *Eumeta japonica* bagworm and a *Eumeta minuscula* bagworm are each allowed to spin a thread on the same basal plate and to produce a nonwoven fabric. A bagworm silk thread from different species of bagworm generally has physical properties as described above in common. However, the features may differ between each bagworm silk thread depending on the species, such as a silk thread with a particularly high elastic modulus, a silk thread with a high fracture strength, and a silk thread with high toughness. Bagworm silk threads with different physical properties, derived from different species, can be combined to enhance advantages of their own and to complement each other's disadvantages.

Additionally, the nonwoven fabric in the present invention may further comprise one or more types of other fibers different from the bagworm silk threads, as far as the effect of the present invention will not be interfered. For example, organic fiber or inorganic fiber can be used. The Organic fiber includes plant-based natural fiber composed mainly of cellulose, such as cotton and linen; animal-based natural fiber, such as silk thread obtained from insect e.g., domesticated silkworm such as *Bombyx mori* and wild silkworm such as larvae of Saturniidae and spider thread; and chemically synthetic fiber, such as aramid, polyamide (including nylon), polyester, polyethylene, acrylic, and rayon. The inorganic fiber includes carbon fiber, glass fiber, metallic fiber (for example, stainless steel, titanium, copper, aluminium, nickel, iron, tungsten, or molybdenum), and an amorphous fiber (for example, a ceramic fiber and rock wool).

Combining a bagworm silk thread and other fiber to produce a nonwoven fabric, a synergistic effect based on the both fibers can be obtained. For example, carbon fiber and glass fiber have very high strength and elastic modulus but have no elongation property, and thus have low toughness and are brittle. In contrast, the bagworm silk thread has high strength and elastic modulus, which are however not as high as those of carbon fiber and glass fiber. However, the bagworm silk thread has an elongation property, which carbon fiber and glass fiber do not have. Accordingly, combining a bagworm silk thread with carbon fiber and/or glass fiber to produce a nonwoven fabric, can enhance advantages of their own can be enhanced and disadvantages can be mutually compensated. The nonwoven fabric produced by combining a bagworm silk thread with carbon fiber and/or glass fiber can be used as a reinforcing fiber to produce a fiber-reinforced composite material with very high strength and elastic modulus and with elongation property.

When the nonwoven fabric of the present invention comprises, in addition to the bagworm silk thread, different type of other fiber, the content of the bagworm silk thread in the reinforcing fiber used for a fiber-reinforced composite material is not limited. For example, the content of the bagworm silk thread may be a mass percentage of 1% by mass or more, 3% by mass or more, 5% by mass or more, 8% by mass or more, 10% by mass or more, 15% by mass or more, 20% by mass or more, 25% by mass or more, 30% by mass or more, 35% by mass or more, 40% by mass or more, 45% by mass or more, 50% by mass or more, 55% by mass or more, 60% by mass or more, 65% by mass or more, 70% by mass or more, 75% by mass or more, 80% by mass or more, 85% by mass or more, 90% by mass or more, 92% by mass or more, 95% by mass or more, 97% by mass or more, 98% by mass or more, or 99% by mass or more.

(1-2) Other Fibers

The reinforced fiber, which is a component of a fiber-reinforced composite material of the present invention, may comprise, in addition to nonwoven fabric, one or more different types of other fibers as optional constituting fibers.

The constitution of the fibers that can be used as reinforced fibers other than the nonwoven fabric essentially follows that of the fibers in the nonwoven fabric. That is, in addition to one or more types of discontinuous fiber and/or continuous fiber of bagworm silk thread, an organic fiber, such as plant-based natural fiber, animal-based natural fiber, and chemically synthetic fiber, and/or inorganic fiber, such as carbon fiber, glass fiber, metallic fiber, and amorphous fiber, may be comprised. These fibers may be in any form, except for a nonwoven fabric, in the fiber-reinforced composite material. For example, the form may be a simple cord-like (string-like) form, a sheet-like form, such as like a woven fabric, a knitted fabric, or a paper, or a combination thereof.

When the reinforcing fiber, which is a component of a fiber-reinforced composite material of the present invention, comprises, in addition to those in the nonwoven fabric, one or more different types of other fibers, the content of the other fibers in the reinforcing fibers is not limited. However, because the nonwoven fabric is a main component of reinforcing fiber in the fiber-reinforced composite material of the present invention, it is generally preferable that the content of the nonwoven fabric is higher than that of the other fibers. For example, the content of the other fibers is preferably a mass percentage of 1% by mass or less, 3% by mass or less, 5% by mass or less, 8% by mass or less, 10% by mass or less, 15% by mass or less, 20% by mass or less, 25% by mass or less, 30% by mass or less, 35% by mass or less, 40% by mass or less, 45% by mass or less, or less than 50% by mass.

(2) Polymer Matrix

A polymer matrix refers to a base material composed of organic polymer and/or inorganic polymer, and the polymer matrix used in a fiber-reinforced composite material of the present invention refers to either an organic polymer or inorganic polymeric, or both polymers. The organic polymer as used herein includes naturally occurring and synthetic polymer.

Naturally occurring polymer is naturally existing polymer, for example, protein, polysaccharide, and natural resin are included. Specific examples of the protein include glue (including collagen and gelatin). Moreover, specific examples of the polysaccharide include starch, cellulose, mannan, and agar. Furthermore, specific examples of natural resin include lacquer, rosin, latex (a natural rubber), and shellac.

Synthetic polymer is polymer obtained by linking monomers via condensation reaction or addition polymerization reaction, and examples thereof include synthetic resin and synthetic rubber.

Synthetic resin is also referred to as plastic. A synthetic resin used as the polymer matrix in the fiber-reinforced composite material of the present invention may be any of a thermosetting resin, a thermoplastic resin, and a combination thereof. The thermosetting resin includes epoxy resin, unsaturated polyester resin, vinyl ester resin, and phenol resin, and the like. The thermoplastic resin includes polyethylene, polypropylene, polyester, polystyrene, polyvinyl chloride, methacrylic resin, fluorocarbon resin, polycarbonate, polyurethane, aromatic polyether ketone resin, and polyphenylene sulfide resin, and the like.

Synthetic rubber includes polybutadiene rubber, chloroprene rubber, styrene-butadiene rubber, isoprene rubber, ethyl propylene rubber, nitrile rubber, silicone rubber, acrylic rubber, fluorocarbon rubber, urethane rubber, and the like.

(3) Component Ratio

The compound ratio of a reinforcing fiber and a polymer matrix in the fiber-reinforced composite material of the present invention is not particularly limited. The compound ratio may normally be such that intended features of the reinforcing fiber such as high strength, high elastic modulus, elongation, and the like can be imparted to the polymer matrix as a base material. Preferably, in the fiber-reinforced composite material of the present invention, the compound ratio is such that elongation, a feature of bagworm silk thread, as well as high strength and elastic modulus can be imparted to the polymer matrix. Specifically, the mass percentage of the bagworm silk thread in the fiber-reinforced composite material ranges from 0.5% by mass to 50% by mass, from 0.8% by mass to 40% by mass, from 1% by mass to 35% by mass, from 1.5% by mass to 30% by mass, from 2% by mass to 28% by mass, or from 3% by mass to 25% by mass, on dry mass basis.

1-3-2. Structure

The structure of a fiber-reinforced composite material of the present invention, that is the arrangement of a reinforcing fiber and a polymer matrix in a fiber-reinforced composite material, is not particularly limited. For example, the structure includes a prepreg in which a nonwoven fabric as a main component of a reinforcing fiber is impregnated with a liquid polymer matrix, and a unified state as a structure in which a plurality of prepregs and the like are layered on each other such that the reinforcing fibers are differently oriented and the like. Moreover, in addition to the above structure, a reinforcing fiber other than a nonwoven fabric may further be dispersed in the layer and/or on the surface of the polymer matrix. The prepreg as described above is normally regarded as an intermediate material for a fiber-reinforced composite material but, in the present specification, it is encompassed in the term fiber-reinforced composite material.

1-4. Effect

According to the fiber-reinforced composite material of the present invention, which comprises a nonwoven fabric comprising a bagworm silk thread as a reinforcing fiber, a fiber-reinforced composite material that has a good balance and high values of strength, elastic modulus, and elongation, which have not been observed in conventional CFRPs and GFRPs, and is isotropic in terms of those physical properties can be provided.

1-5. Use

The fiber-reinforced composite material of the present invention can be used in various fields, including use of conventional fiber-reinforced composite material. Examples of the fields include sports and leisure (for example, golf shafts, rackets, fishing poles, and bicycle parts), housing (for example, bath and septic tanks), civil engineering and construction (for example, aseismic reinforcing material, lightweight building material, wall, floor reinforcing material, and truss structural material), transportation equipment (for example, automobile, ship, airplane, helicopter, and high-pressure hydrogen tank), industrial equipment (for example, cabinet, home electronic appliance part, printed circuit board, and wind turbine blade), and aerospace field (for example, rocket and artificial satellite). Particularly, the fiber-reinforced composite material of the present invention is suitable for use in fields that require a material with high elongation as well as with high strength and elastic modulus, because the fiber-reinforced composite material of the present invention has features of elongation and toughness, which conventional fiber-reinforced composite materials such as CFRPs and GFRPs do not have, as well as has high strength and elastic modulus and, furthermore, is isotropic in terms of those physical properties.

Moreover, a fiber-reinforced composite material with high biocompatibility can be obtained by using bagworm silk thread alone or a combination of a bagworm silk thread and animal-based fiber, such as silkworm silk thread, as reinforcing fiber and using a naturally occurring organic polymer, such as collagen or gelatin, as polymer matrix. Therefore, such fiber-reinforced composite material can be used in medical field as a base material for tissue regeneration, revascularization, or the like.

Furthermore, the nonwoven fabric comprising a bagworm silk thread of the present invention can be used for medical material (for example, mask, wound covering material, adhesion preventing film, and artificial skin), filter, industrial material (for example, wall cloth and decoration material), and beauty product (for example, cosmetic facial mask).

2. Method for Producing Fiber-Reinforced Composite Material

2-1. Overview

The second aspect of the present invention is a method for producing a fiber-reinforced composite material. The method of the present invention is a method for producing and/or molding the fiber-reinforced composite material according to the first aspect. According to the method of producing of the present invention, the fiber-reinforced composite material comprising a bagworm silk thread can be easily produced and molded.

2-2. Method

The method for producing the fiber-reinforced composite material of the present invention can be essentially performed according to conventional methods for producing a fiber-reinforced composite material, except for using the bagworm silk thread as a reinforcing fiber. For example, methods that are normally used for producing CFRPs or GFRPs can be directly used when a long fiber bagworm silk thread is used as a reinforcing fiber. Various methods are known as the method for producing, and an appropriate method may be selected depending on the purpose such as intended use and shape.

For example, in the method for producing a prepreg, an appropriate polymer matrix may be impregnated into a nonwoven fabric comprising a bagworm silk thread as a reinforcing fiber, either alone or along with other reinforcing fiber selected in the form of woven fabric, knitted fabric, paper, or the like. When the polymer matrix is a thermosetting resin, the product is a half-cured prepreg, in which polymerization remains incomplete. On the other hand, when the polymer matrix is a thermoplastic resin or a naturally occurring polymer such as collagen, the product is a fully cured prepreg, in which polymerization is completed.

General molding methods include sheet winding molding method, press-molding method, autoclave molding method, RTM (Resin Transfer Molding) method, VaRTM (Vacuum Resin Transfer Molding) method, SMC (Sheet Molding Compound) molding method, vacuum bag molding method, hand lay-up molding method, and fiber placement molding method, and the like.

The "sheet winding molding method" is a method in which a prepreg is wrapped around a rotating metal mold (mandrel) while impregnated with polymer matrix, and the core is removed after cured. The "press-molding method" is a method in which a compound or a prepreg is placed into a mold and then pressed with heating to mold. The "autoclave molding method" is a method in which a prepregs is layered in a mold, covering the mold with a bag, and then pressed with heating to mold after removing the air and volatile substance present in an autoclave under vacuum. The "RTM method" is a method also referred to as a resin injection molding method, in which a melted thermosetting resin is introduced under low pressure into a closed system comprising a reinforcing fiber-based preform placed into a mold, and demolded after thermally cured. The "VaRTM method" is a variant of the RTM method, in which a closed system wherein reinforcing fiber is layered are degassed and introduced with a thermosetting resin, and demolded after thermally cured. The "SMC molding method" is a method in which a sheet-shaped material composed of reinforcing fiber and polymer matrix is layered to mold. The "vacuum bag molding method" is a method in which a layered material sealed with a film is compression-molded by atmospheric pressure under the vacuum. The "hand lay-up molding method" is a method in which a stack of prepreg is manually layered in a mold and cured to mold. The "fiber placement molding method" is a method in which a prepreg in tape-like form or a tow impregnated with a polymer matrix is layered in various molds with three-dimensional form, and cured to mold. Specific processes of these methods are all known in the field of fiber-reinforced composite material, and may be performed in reference to these known methods.

2-3. Production Process

The production process of the method for producing the fiber-reinforced composite material of the present invention comprises a contacting process as an essential process, and also comprises a molding process, a curing process, and a demolding process as necessary. Each of the processes will be specifically described below.

(1) Contacting Process

The "contacting process" is a process bringing into contact between a reinforcing fiber and a polymer matrix. The process to contact is not particularly limited as long as both components are directly contact. The reinforcing fiber may be dispersed in, soaked in, or impregnated with the polymer matrix dissolved in liquid form, or a fiber bundle or sheet of the reinforcing fiber may be sandwiched between sheets of the polymer matrix, as in the case of the SMC molding method.

The prepreg described above is a sheet composed of reinforcing fiber impregnated with polymer matrix, and thus the production process comprises only the contacting process.

(2) Molding Process

The "molding process" is a process in which reinforcing fiber and/or polymer matrix as components of a fiber-reinforced composite material, are molded into a desired shape. This process is an optional process and is performed according to the type of method of producing.

In this process, a mold, such as metal mold, is used to form a shape based on the mold. Reinforcing fibers and/or prepregs may be layered to mold, as necessary. The order of the molding process and the contacting process described above is not limited, and may be different depending on the method of producing. For example, the contacting process precedes the molding process in the above-described filament winding molding method, sheet winding molding method, press-molding method, autoclave molding method, hand lay-up molding method, fiber placement molding method, and the like. On the other hand, in the RTM method and VaRTM method, the molding process is performed after molding a reinforcing fiber-based preform in a metal mold before a polymer matrix is introduced into the metal mold, followed by the contacting process. This process may be performed according to the method of producing.

(3) Curing Process

The "curing process" is the process in which the polymerization of the polymer matrix is promoted and/or completed after the preceding process. In this process, the polymer matrix is cured, and the production of a fiber-reinforced composite material is thereby completed. The curing process can comprise a heating step and/or a cooling step.

The "heating step" is a step in which the polymer matrix is heated to promote and/or complete the polymerization. This step is performed when a thermosetting resin is used as the polymer matrix. On the other hand, when a thermoplastic resin or naturally occurring polymer is used as the polymer matrix, this step can correspond to the contact or molding processes described above because the heating releases polymerization, and softens and melts the polymer matrix.

The heating temperature is not particularly limited. Although the temperature varies depending on the type of polymer matrix used, the heating may normally be performed at a temperature ranging from 20° C. to 250° C., from 23° C. to 200° C., from 25° C. to 180° C., from 27° C. to 150° C., or from 30° C. to 120° C. Moreover, the heating time is related to the heating temperature. In general, the lower the heating temperature, the longer the heating time, and the higher the heating temperature, the longer the heating time. The heating may normally be performed for a period of time ranging from 0.5 hours to 48 hours, from 1 hour to 42 hours, from 1.5 hours to 36 hours, from 2 hours to 30 hours, from 2.5 hours to 24 hours, or from 3 hours to 18 hours.

The "cooling step" is a step in which the heated polymer matrix is cooled or is cured by cooling. When a thermosetting resin is used as the polymer matrix, this step is performed to cool a fiber-reinforced composite material after thermally curing reaction in the heating step is completed. Moreover, when a thermoplastic resin or naturally occurring polymer is used as the polymer matrix, the cooling promotes and/or completes the polymerization, and the production of a fiber-reinforced composite material is completed by curing of the polymer matrix.

The cooling temperature is also not limited. Although the temperature varies depending on the type of polymer matrix used, the cooling may normally be performed at a temperature of not higher than 260° C., not higher than 200° C., not higher than 180° C., not higher than 150° C., not higher than 120° C., not higher than 100° C., not higher than 90° C., not higher than 80° C., not higher than 70° C., not higher than 60° C., not higher than 50° C., not higher than 40° C., not higher than 35° C., not higher than 30° C., not higher than 27° C., not higher than 25° C., not higher than 23° C., not higher than 20° C., not higher than 18° C., not higher than 15° C., or not higher than 10° C. The lowest temperature is not particularly limited but may normally be 4° C., 0° C., −10° C., −15° C., or −20° C. Moreover, the cooling should be carried out for a period of time ranging from 0.1 hours to 1 hour, from 0.2 hours to 0.9 hours, from 0.3 hours to 0.8 hours, from 0.4 hours to 0.7 hours, or from 0.5 hours to 0.6 hours.

(4) Demolding Process

The "demolding process" is a process in which the fiber-reinforced composite material is removed from the mold after the curing process. Specifically, in this process, the molded fiber-reinforced composite material is removed from the metal mold or mandrel used in the molding process. The method for demolding may be performed according to the method known in the art.

EXAMPLES

Example 1: Production of a Fiber-Reinforced Composite Material Comprising a Nonwoven Fabric Made of a Bagworm Silk Thread(s) and Physical Properties of the Same Purpose Fiber-reinforced composite material, comprising nonwoven fabric made of a bagworm silk thread(s) as a reinforcing fiber, were produced to examine the physical properties thereof.

Method

Larvae of *Eumeta japonica* (with a bag length of 10 to 15 mm) collected at an orchard in Tsukuba, Ibaraki, Japan were used.

A nonwoven fabric made of a bagworm silk thread(s) was produced by the following method. About 50 bagworms were released in a cubic breeding cage with each length of its depth, width, and height being about 20 cm and were bred for 7 days. The top panel of the breeding cage is an acrylic plate and is detachable. Since the bagworm has a habit of migrating to upward, it stays longer on the back of the top panel of the cage. Consequently, threads are continuously spun in random patterns by the bagworms on the back of the top panel, and a silk thread sheet composed of deposited bagworm silk threads (foothold silk threads) is formed 7 days later. Such a silk thread sheet was sprayed with 70% ethanol and then carefully peeled from the top panel to obtain a bagworm silk-based nonwoven fabric (bagworm silk nonwoven fabric: BSNF).

An ethylene-vinyl acetate copolymer (EVA) resin was used as a polymer matrix.

An adhesive resin for a hot glue gun (Taiyo Electric Ind. Co., Ltd.) was used as the EVA resin. As a substitute for a metal mold, a mold with a circular shape with the diameter of about 80 mm was made from a silicone rubber sheet with a thickness of 0.5 mm, and the EVA resin was placed in the mold and then pressed under a pressure of about 2 MPa at 100° C. to obtain two EVA resin sheets.

Next, a stack (about 30 mm in length and width) of 10 layers of the nonwoven fabric comprising a bagworm silk thread(s) as reinforcing fibers (BSNF) was sandwiched between the EVA resin sheets, and was pressed under a pressure of about 2 MPa between two heated plates at 100° C. The stack was cooled down to give a film of a fiber-reinforced composite material (hereinafter referred to as "BSNF/EVA composite material") composed of the BSNF and EVA resin with a thickness of about 270 μm. At the same time, a simple EVA resin (hereinafter referred to as "EVA resin") film with a similar thickness was also produced as a negative control, wherein the resin film was produced only from the two EVA sheets pressed under pressure without the BSNF.

Subsequently, reed-shaped test strips with a width of about 1.5 mm and a length of about 20 mm were cut out from each of the films described above, and were subjected to mechanical tests. For cutting out the test strips, a test strip was firstly cut out from the nonwoven fabric in the direction at an angle of 0°, where an arbitrary direction was defined as the direction of 0° in the nonwoven fabric. Then, test strips were similarly cut out from the nonwoven fabric in the directions at angles (cutting angles) of 30°, 60°, and 90° relative to the direction at an angle of 0° in a clockwise fashion. Finally, four types of test strips were obtained from each film, which were different in cutting angle by 30 degrees. Moreover, the mass percentage of reinforcing fiber relative to the total mass of the test strip was calculated as the fiber content (% by mass: wt %).

(Result 1)

The mass percentage of reinforcing fiber relative to the total mass in each test strip was 4.3 wt % in the BSNF/EVA composite material.

The results of the mechanical tests on each test strip from the BSNF/EVA composite material and the EVA resin are presented in Tables 1 and 2, respectively. Additionally, the stress-strain curves of the test strips cut out in the direction at an angle of 0° are shown in the FIGURE.

TABLE 1

|   | Fiber content (%) | Cutting angle (°) | Elastic modulus (MPa) | Maximum strength (MPa) | Strain (%) |
|---|---|---|---|---|---|
| BSNF/EVA composite material | 4.3 | 0 | 98.5 | 6.2 | 44.4 |
|  | 4.3 | 30 | 111.1 | 6.5 | 42.1 |
|  | 4.3 | 60 | 84.1 | 6.9 | 42.6 |
|  | 4.3 | 90 | 78.9 | 6.5 | 38.0 |
| Average | 4.3 | — | 93.1(±12.6)* | 6.5(±0.2)* | 41.8(±2.3)* |

*the number in the parentheses represents the standard deviation.

TABLE 2

|   | Cutting angle (°) | Elastic modulus (MPa) | Maximum strength (MPa) | Strain (%) |
|---|---|---|---|---|
| Simple EVA resin | 0 | 53.2 | 3.3 | 378.4 |
|  | 30 | 43.3 | 4.1 | 666.5 |
|  | 60 | 40.1 | 3.5 | 815.0 |
|  | 90 | 62.0 | 3.8 | 779.0 |
| Average | — | 49.7 (±8.6)* | 3.7 (±0.3)* | 659.7 (±171.4)* |

*the number in the parentheses represents the standard deviation.

In Tables 1 and 2, the "elastic modulus" means an initial elastic modulus and refers to a value given as the initial slope of a stress-strain curve, which corresponds to the proportional constant in the range of validity meeting Hooke's law, which is the proportional relationship between stress and strain, when a sample is pulled. In general, a higher value of the initial elastic modulus indicates a smaller strain for a given tensile stress, meaning stiffer property. Additionally, the "maximum strength" refers to the maximum stress just before the material breaks. In general, a higher value of the maximum strength indicates a higher degree of resistance to stress. Furthermore, the "strain" means elongation at break and refers to the extension in length of a sample at the point of break. In general, a higher value of the strain indicates a higher elasticity.

Result 2

The anisotropy, which is a difference in terms of these mechanical features, elastic modulus and maximum strength, depending on the difference in cutting angles of the test strips, was hardly detected in either the EVA resin or the BSNF/EVA composite material. Additionally, the elastic modulus and maximum strength of the BSNF/EVA composite material were shown to be about 2 times higher in the test strips of all the cutting angles than those of the EVA resin. This indicates that the BSNF/EVA composite material is stiffer and stronger than the EVA resin. These results confirmed that stiffness (high elastic modulus) and strength (high strength) can be imparted to an EVA resin in an isotropic fashion by using a nonwoven fabric made of a bagworm silk thread as a reinforcing fiber.

Furthermore, the strain (elongation at break) of the BSNF/EVA composite material was shown to be about 40% in the measured test strips of all the cutting angles. This result suggests that the problem of low elongation at break, which arises when carbon fibers or glass fibers are used for a fiber-reinforced composite material, can be significantly improved by using a nonwoven fabric made of a bagworm silk thread.

That is, it was indicated that the presence of a nonwoven fabric made of a bagworm silk thread in a fiber-reinforced composite material at a content as low as about 4 wt % can allow the fiber-reinforced composite material to have significantly high elongation of about 40%, as well as dramatically enhance the mechanical features of a polymer matrix, such as strength and elastic modulus, in an isotropic fashion.

All publications, patents, and patent applications cited in this specification are incorporated herein by reference in their entirety.

The invention claimed is:

1. A fiber-reinforced composite material with a sheet-like shape consisting of a polymer matrix and a nonwoven fabric consisting of at least one bagworm silk thread and an additional fiber,
    wherein the additional fiber is at least one organic fiber other than bagworm silk thread, at least one inorganic fiber, and/or a combination of these fibers,
    wherein the bagworm silk thread consists of at least one continuous fiber silk thread wherein the fiber-reinforced composite material is isotropic in terms of elastic modulus, strength and elongation.

2. The fiber-reinforced composite material according to claim 1, wherein the organic fiber is a silkworm silk thread and/or a spider thread.

3. The fiber-reinforced composite material according to claim 1, wherein the polymer matrix is resin, glue, starch, agar, or a combination thereof.

4. The fiber-reinforced composite material according to claim 1, wherein the mass percentage of the bagworm silk thread in the whole of the fiber-reinforced composite material ranges from 0.5% by mass to 50% by mass.

* * * * *